UNITED STATES PATENT OFFICE.

GIACOMO ROSSI, OF PORTICI, ITALY.

INDUSTRIAL MICROBIOLOGICAL VEGETAL RETTING PROCESS BY PECTIC AEROBIC MICROBES IN A GAS-CURRENT.

977,133.   Specification of Letters Patent.   Patented Nov. 29, 1910.

No Drawing.   Application filed April 2, 1908. Serial No. 424,793.

*To all whom it may concern:*

Be it known that I, GIACOMO ROSSI, a subject of the King of Italy, residing at Portici, Naples, Italy, professor at the Institute of Agricultural Bacteriology of Portici, have invented a certain new and useful Industrial Microbiological Vegetal Retting Process by Pectic Aerobic Microbes in a Gas-Current.

The vegetal retting process forming the subject matter of the present invention is based on the discovery that a gas current is able to regulate and increase the retting effect of pectic aerobic microbes,—hitherto held to be ineffective for agricultural and industrial purposes,—so as to make its effect industrially utilizable.

My new process comprises the following steps: The vegetals or parts or fragments of vegetals to be retted are previously cleaned by washing and then put into suitable vessels, whereupon after they have been, or not, pasteurized or sterilized, a quantity of water, in which eventually $CaCO_3$ may be suspended, is poured in, sufficient to cover them entirely. The whole is then left to itself or, according to the kind of material to be retted or the degree of retting desired, is pasteurized, boiled or sterilized. The vessel is provided with a suitable device permitting of having an air or other suitable gas current to pass continuously or nearly continuously for the whole time of retting throughout the entire height of the liquid therein contained. Before the gas reaches the retting vessel it is caused to pass through a suitable sterilizer, *i. e.* a tube filled with sterilized cotton-wool, or similar material. The vessel is tightly closed by a cover. Through an inlet,—equally capable of being tightly closed,—a suitable quantity of bacilliculture of a pectic aerobic microbe is poured into the vessel, such as *Bacillus comesii rossi*, *B. kramerii rossi et carbone*, *B. pecticus rossi et carbone*, *B. macerans schardinger*, *B. (mesentericus) vulgatus* (Flügge) migula, *B. mesentericus lehmann et neumann*, *B. mesentericus ruber globig*, *B. subtilis F. cohn. streptolhrix-chromogena gasparini*, *Bacillus asterosporus* (Meyer) migula, *B. carotovorus* Jones, Marmier's bacillus, Spieckermann's bacillus,—and if the said bacilliculture, as mentioned above, was heated, it must be previously cooled down and treated with the utmost antiseptic precautions. Thereupon the inlet is closed and a gas current, as stated above, is passed through the contents of the vessel. It will also be advantageous to keep the retting liquid at the beginning and during the whole time at a temperature as near as possible to that which forms the optimum for the retting microbe used, and to keep the space in which the retting is effected during the whole time of retting at an analogous temperature. It will also be advantageous to provide the vessel with a lateral tightly closing tube capable of being closed and opened without interfering with the asepsis of the vessel, and communicating with its interior from which samples may be taken from time to time in order to ascertain the degree of retting of the contents of the vessel.

The retting may be completed in a time from 3 to 20 days, according to the material under treatment and the degree of retting desired. By the above said samples the proper time may be always ascertained when the operation is to be interrupted, being completed. As soon as this is the case the vessel is opened and the retted material is taken out of same.

For agricultural and industrial purposes and uses the retting vessel may also be uncovered or provided with an untight cover, and furthermore the pipes or tubes for pouring in the bacilliculture or taking out samples may as well be omitted, and the said operations may be effected directly through the opening of the vessel. Sterilization of the gas to be passed through the retting liquid may also be dispensed with, as the pectic microbes being in their best conditions of existence are able to conquer the other microbes existing in the retting vessel or introducing themselves in the same from the atmosphere, the gas current, etc.

For certain textile fibers such as ramie, etc., it may also be advantageous to complete by an energetic physic mechanic washing with water the separation of the impurities and of the pectic substances which latter have been only made soluble by the retting process.

The above process is adapted for use with the textile industries, hemp retting, flax retting, etc.

Having now fully described my said invention and the manner in which the same is to be performed, what I claim and desire to protect by Letters Patent of the United States, is:—

The above described vegetal retting process comprising cleaning the vegetals, inserting same into suitable tight vessels, pouring a bacilliculture of a pectic aerobic microbe into the vessel, and passing a purified gas current through the vegetals and liquid in the vessel, the temperature at which the retting process is effected corresponding as much as possible to the optimum of the conditions of life of the microbe used.

In testimony whereof I have affixed my signature in presence of two witnesses.

GIACOMO ROSSI.

Witnesses:
  RAG ABBILIO GILARDI,
  COLOMBA GACCHINI.